United States Patent
Yamamoto et al.

(10) Patent No.: US 7,755,511 B2
(45) Date of Patent: Jul. 13, 2010

(54) PARKING ASSISTANCE APPARATUS

(75) Inventors: Satoshi Yamamoto, Aichi (JP); Kazunori Shimazaki, Aichi (JP); Tomio Kimura, Aichi (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 340 days.

(21) Appl. No.: 11/885,858

(22) PCT Filed: Feb. 28, 2006

(86) PCT No.: PCT/JP2006/304207

§ 371 (c)(1),
(2), (4) Date: Sep. 6, 2007

(87) PCT Pub. No.: WO2006/100892

PCT Pub. Date: Sep. 28, 2006

(65) Prior Publication Data

US 2008/0174452 A1 Jul. 24, 2008

(30) Foreign Application Priority Data

Mar. 22, 2005 (JP) ............................. 2005-082040

(51) Int. Cl.
*G08G 1/14* (2006.01)
(52) U.S. Cl. ................. 340/932.2; 340/425.5; 180/199; 382/104; 701/1; 701/41
(58) Field of Classification Search ............. 340/932.2, 340/425.5, 937, 935; 180/199, 204; 382/104, 382/106; 701/1, 41; 705/418
See application file for complete search history.

(56) References Cited

U.S. PATENT DOCUMENTS 5,945,799 A * 8/1999 Shimizu ..................... 318/587

(Continued)

FOREIGN PATENT DOCUMENTS

JP 2000-335436 12/2000

(Continued)

OTHER PUBLICATIONS

Japanese Office Action mailed Jun. 2, 2009 for the corresponding Japanese Patent Application No. 2005-082040.

(Continued)

*Primary Examiner*—Anh V La
(74) *Attorney, Agent, or Firm*—Locke Lord Bissell & Liddell, LLP

(57) ABSTRACT

In a parking assistance apparatus disclosed herein, a position and a yaw angle of a vehicle are acquired continuously from an initial stop position A, and a vehicle mark C2' in moving the vehicle backwards with a steering angle maintained during a backward movement operation from a backward movement start position B in parking the vehicle in a target parking space S is displayed on a display. The vehicle mark C2' is displayed in a shifting manner on the display such that the target parking space S is traced based on a momentary steering angle and a momentary yaw angle of the vehicle, which result from backward movement of the vehicle. When the vehicle mark C2' deviates from the target parking space S during the backward movement operation, a driver adjusts the steering angle. The vehicle mark C2' is shifted on the display based on a change in the steering angle to be turned into a vehicle mark C4 at a suitable position corresponding to the target parking space S.

17 Claims, 11 Drawing Sheets

U.S. PATENT DOCUMENTS 6,487,481 B2 * 11/2002 Tanaka et al. .................. 701/41
7,366,595 B1 * 4/2008 Shimizu et al. ............. 701/301
7,375,651 B2 * 5/2008 Shimazaki et al. ....... 340/932.2

FOREIGN PATENT DOCUMENTS

| JP | 2002-036991 A | 2/2002 |
|---|---|---|
| JP | 2002-251632 | 9/2002 |
| JP | 2003-054437 | 2/2003 |
| JP | 2004-025942 A | 1/2004 |
| JP | 2004-284370 A | 10/2004 |

OTHER PUBLICATIONS

International Search Report of corresponding International Application No. PCT/JP2006/304207, dated Jul. 5, 2006.

Japanese Office Action mailed Sep. 29, 2009 for the corresponding Japanese Patent Application No. 2005-082040.

* cited by examiner

PARKING ASSISTANCE APPARATUS

TECHNICAL FIELD TO WHICH THE INVENTION BELONGS

The present invention relates to a parking assistance apparatus, and more particularly, to an apparatus providing a driver with guidance on a driving operation in lateral parking.

PRIOR ART

Conventionally, there has been developed a driving assistance apparatus providing assistance in a driving operation by displaying on a display an image captured by a surveillance camera mounted to a vehicle during a backward movement thereof, and also displaying on the display an estimated locus corresponding to a steering angle of a steering wheel to be superimposed on the image displayed, as disclosed in, for example, JP 2002-251632 A.

The driving assistance apparatus as described above allows a driver to perform, for example, lateral parking of a vehicle in a parking space by driving the vehicle while viewing the estimated locus on the display.

Problem To Be Solved By The Invention

However, merely looking at the estimated locus results in a problem in that it is unclear which part of the estimated locus should be matched to a target parking space or how that part of the estimated locus should be matched thereto, so it is difficult to accurately park the vehicle in the target parking space.

The present invention has been made as a solution to the above problems. It is an object of the present invention to provide a parking assistance apparatus allowing a driver to reliably and easily park a vehicle in the target parking space.

Means For Solving The Problem

A first parking assistance apparatus according to the present invention for supporting a driving operation in parking a vehicle in a target parking space by moving the vehicle forwards from an initial position, which is in a predetermined positional relationship and a predetermined angular relationship with the target parking space, with a steering wheel turned, stopping the vehicle at a backward movement start position, and then moving the vehicle backwards with the steering wheel turned reversely thereto or further moving the vehicle backwards with the steering wheel turned again reversely thereto, includes: a camera for capturing an area behind the vehicle; a display provided in a driver seat of the vehicle; a steering angle sensor for detecting a steering angle; yaw angle detecting means for detecting a yaw angle of the vehicle; and a controller. The controller acquires a position and a yaw angle of the vehicle continuously from the initial position based on the steering angle detected by the steering angle sensor and the yaw angle of the vehicle detected by the yaw angle detecting means, respectively, and displays the image captured by the camera on the display in moving the vehicle backwards. The controller displays on the display in a superimposed manner an estimated vehicle space indicating at least a lateral position of the vehicle at a position reached by the vehicle in moving the vehicle backwards by a difference between a current yaw angle of the vehicle and an angle of the target parking space while a current steering angle detected by the steering angle sensor is maintained during a final backward movement operation in parking the vehicle in the target parking space. The controller displays on the display in a shifting manner the estimated vehicle space based on a momentary steering angle and a momentary yaw angle of the vehicle, which result from backward movement of the vehicle, and shifts the estimated vehicle space on the display based on a difference between a yaw angle of the vehicle at a time when the steering angle is adjusted during the final backward movement operation and the angle of the target parking space, and on the adjusted steering angle detected by the steering angle sensor.

In other words, there are two patterns of movement of the estimated vehicle space on the display. One is a movement in which a positional relationship with an image captured by the camera is maintained during backward movement of the vehicle. The other is a movement according to the steering angle regardless of the image captured by the camera.

Here, the "angle of the target parking space" indicates a longitudinal direction of the vehicle in completing the parking in the target parking space. For example, when the yaw angle of the vehicle at the initial position is 0°, in the case where the initial position is perpendicular to the parking space in lateral parking, the angle of the target parking space is 90°, and in the case where the initial position is parallel to the parking space in parallel parking, the angle of the target parking space is 0°.

A second parking assistance apparatus according to the present invention for supporting a driving operation in parking a vehicle in a target parking space by stopping the vehicle at a backward movement start position, which is in a predetermined positional relationship and a predetermined angular relationship with the target parking space, and then moving the vehicle backwards with the steering wheel operated or further moving the vehicle backwards with the steering wheel turned again reversely thereto, includes: a camera for capturing an area behind the vehicle; a display provided in a driver seat of the vehicle; a steering angle sensor for detecting a steering angle; yaw angle detecting means for detecting a yaw angle of the vehicle; and a controller. The controller acquires a position and a yaw angle of the vehicle continuously from the backward movement start position based on the steering angle detected by the steering angle sensor and the yaw angle of the vehicle detected by the yaw angle detecting means, respectively, and displays the image captured by the camera on the display in moving the vehicle backwards. The controller displays on the display in a superimposed manner an estimated vehicle space indicating at least a lateral position of the vehicle at a position reached by the vehicle in moving the vehicle backwards by a difference between a current yaw angle of the vehicle and an angle of the target parking space while a current steering angle detected by the steering angle sensor is maintained during a final backward movement operation in parking the vehicle in the target parking space. The controller displays on the display in a shifting manner the estimated vehicle space based on a momentary steering angle and a momentary yaw angle of the vehicle, which result from backward movement of the vehicle, and shifts the estimated vehicle space on the display based on a difference between a yaw angle of the vehicle at a time when the steering angle is adjusted during the final backward movement operation and the angle of the target parking space, and on the adjusted steering angle detected by the steering angle sensor.

EMBODIMENT MODE FOR CARRYING OUT THE INVENTION

The embodiments of the present invention will be described hereinafter based on the accompanying drawings.

First Embodiment

Figure 1:
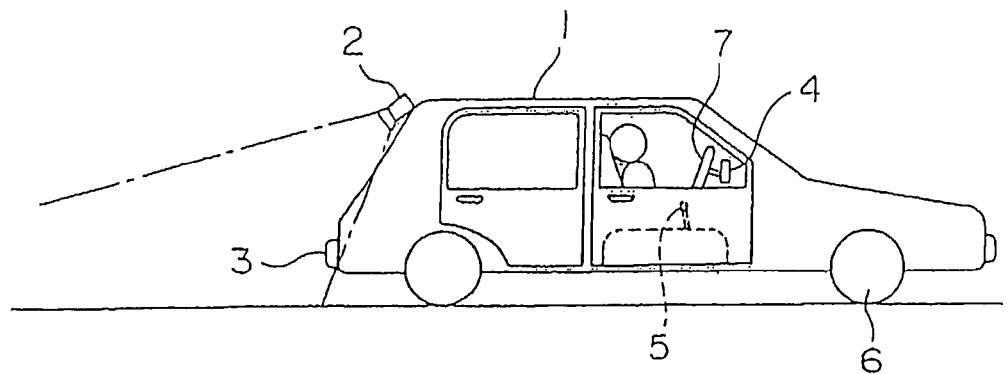
FIG. 1 is a lateral view of a vehicle mounted with a parking assistance apparatus according to a first embodiment of the present invention.

As shown in FIG. 1, a rear view surveillance camera 2 capturing a rear view of a vehicle 1 is mounted to a rear portion of the vehicle 1. A rear bumper 3 of the vehicle 1 is captured in a lower end portion of a visible range of the camera 2. A liquid-crystal color display 4 is provided near a driver seat of the vehicle 1. When a parking assistance operation is performed based on the present invention, an image captured by the camera 2 is displayed on the display 4, which is usually employed as a display unit for a navigation system. Further, a gearshift lever 5 is provided beside the driver seat. Front wheels 6 as steering tire wheels are steered by operating a steering wheel 7.

Figure 2:
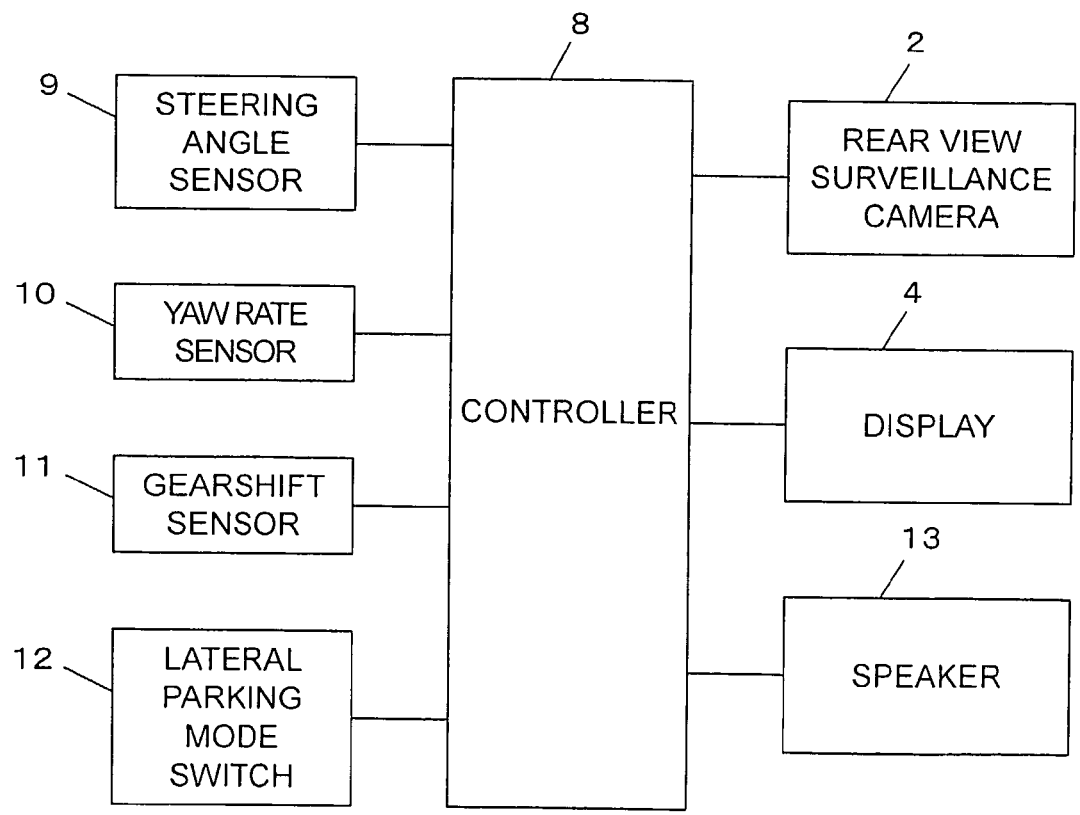
FIG. 2 is a block diagram showing a configuration of the parking assistance apparatus according to the first embodiment.

FIG. 2 shows a construction of a parking assistance apparatus according to a first embodiment of the present invention. A controller 8 is connected to the camera 2 and the display 4. A steering angle sensor 9 for detecting a steering angle of the steering wheel 7, a yaw rate sensor 10 for detecting an angular speed of the vehicle 1 in its yaw angle direction, and a gearshift sensor 11 generating a backward movement signal when the gearshift lever 5 is changed to a reverse position are connected to the controller 8. In addition, a lateral parking mode switch 12 for informing the controller 8 that the vehicle 1 is to perform lateral parking is also connected to the controller 8. Furthermore, a speaker 13 for guiding the driver with information on driving operations is connected to the controller 8.

The controller 8 is provided with a CPU (not shown), a ROM (not shown) in which a control program is stored, and a working RAM (not shown).

Data specific to the vehicle and the control program are stored in the ROM. The data include a minimum turning radius Rmin in the case where the vehicle 1 makes a turn with its steering wheel 7 turned by a maximum amount, and the control program performs parking assistance when the vehicle 1 is performing lateral parking. The CPU operates based on the control program stored in the ROM.

When the lateral parking mode switch 12 is thrown, the controller 8 recognizes an initial stop position as an initial position, calculates a yaw angle of the vehicle 1 by integrating its angular speed which is input from the yaw rate sensor 10, and computes a backward movement start position defined by a parking-permitting position and a parking-permitting yaw angle based on the calculated yaw angle. If it is determined based on a steering angle and a yaw angle during a forward movement that the vehicle 1 has reached the backward movement start position, the controller 8 issues guiding information via the speaker 13 to urge the driver to stop the vehicle.

The controller 8 also determines whether or not the driver has actually stopped the vehicle at the backward movement start position. If the position turns out to be inappropriate, the controller 8 informs the driver of this inappropriateness acoustically or otherwise.

Sensing by means of the gearshift sensor 11 that the gearshift lever 5 has been changed to the reverse position, the controller 8 displays an image captured by the camera 2 as to an area behind the vehicle as well as an estimated vehicle space in the case where the vehicle has moved backwards by a predetermined turning angle while maintaining a steering angle detected by the steering angle sensor 9 on the display 4 in a superimposed manner. This estimated vehicle space moves on the display 4 according to the steering angle. A suitable steering angle in moving backwards is obtained when the driver operates the steering wheel 7 so as to establish a suitable positional relation between the estimated vehicle space and a target parking space on the display 4.

Figure 3:
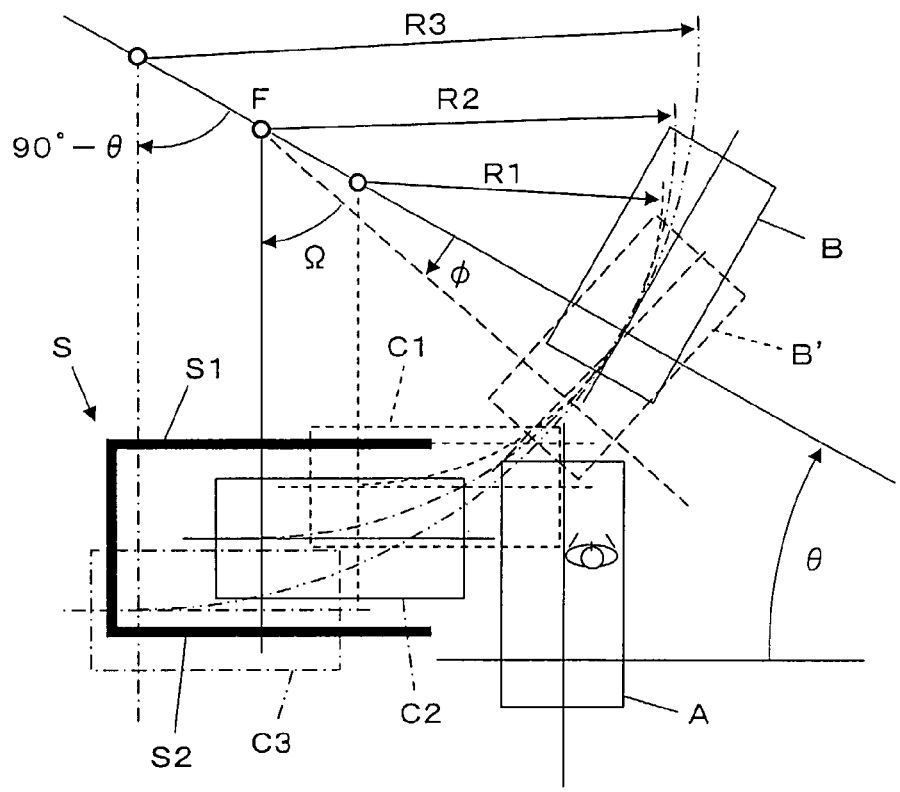
FIG. 3 is a view schematically and stepwise showing positions of the vehicle during lateral parking thereof in the first embodiment.

Referring to FIG. 3, the operation in performing lateral parking will now be described specifically. First of all, the vehicle is initially stopped when it is substantially perpendicular to a target parking space S and about 0.5 to 1 m apart from an entrance of the target parking space S with the driver seat corresponding to a predetermined position of the target parking space S, for example, when a central portion of the target parking space S is located right beside the driver. This vehicle position is defined as an initial stop position A as an initial position.

If the driver throws the lateral parking mode switch 12 at the initial stop position A, the controller 8 recognizes the start of parking guidance and causes the speaker 13 to provide an audio guidance such as "You will now be provided with guidance on lateral parking. Please turn the steering wheel, move forwards, and stop upon the issuance of a sign". As soon as the lateral parking mode switch 12 is thrown, the controller 8 sets a yaw angle of the vehicle 1 at the initial stop position A as a reference position for a yaw angle.

The driver operates the steering wheel 7 and moves the vehicle 1 forwards while making a turn. In the case shown in FIG. 3, the driver slowly moves the vehicle 1 forwards while turning the steering wheel 7 to the right. At this moment, the controller 8 continues to acquire a steering angle detected by the steering angle sensor 9 and an angular speed of the vehicle 1 input from the yaw rate sensor 10, and grasps the yaw angle and position of the vehicle 1 with respect to the target parking space S, for example, by integrating data on the steering angle and angular speed which have been acquired from the initial stop position A where the lateral parking mode switch 12 is thrown. In other words, the controller 8 calculates a momentary yaw angle by integrating a momentary angular speed, obtains a turning radius from a momentary steering angle, integrates a moving distance of the vehicle 1 on the assumption that the vehicle 1 moves by an amount of change in the momentary yaw angle in that state, and calculates a current relative position of the vehicle 1 with respect to the initial stop position A. The steering angle need not be held constant but may be changed in a midcourse.

If it is determined that the vehicle 1 has moved forwards while making a turn by an angle θ from the initial stop position A and then reached a backward movement start position B for moving the vehicle backwards to park in the target parking space S, the controller 8 provides the driver with guiding information as an instruction to stop the vehicle. For instance, audio guidance such as "Dingdong! Please operate the steering wheel and move slowly backwards while keeping the target position in the yellow frame." is issued from the speaker 13. The backward movement start position B means not only a certain position but also a region permitting arrival within the target parking space S by moving the vehicle 1 backwards with the steering wheel 7 fixed at a certain steering angle (i.e., a parking-permitting range).

When the vehicle 1 reaches the backward movement start position B, the target parking space S is located behind the vehicle 1 and within a capturing range of the rear view surveillance camera 2. Thus, the vehicle 1 can arrive the backward movement start position B with no image captured by the camera 2 displayed on the display 4. Because guidance is provided without relying on an image captured by the camera 2, the driver finds it easy to pay attention to obstacles, pedestrians, and the like around the vehicle when moving forwards while making a turn.

Figure 4:
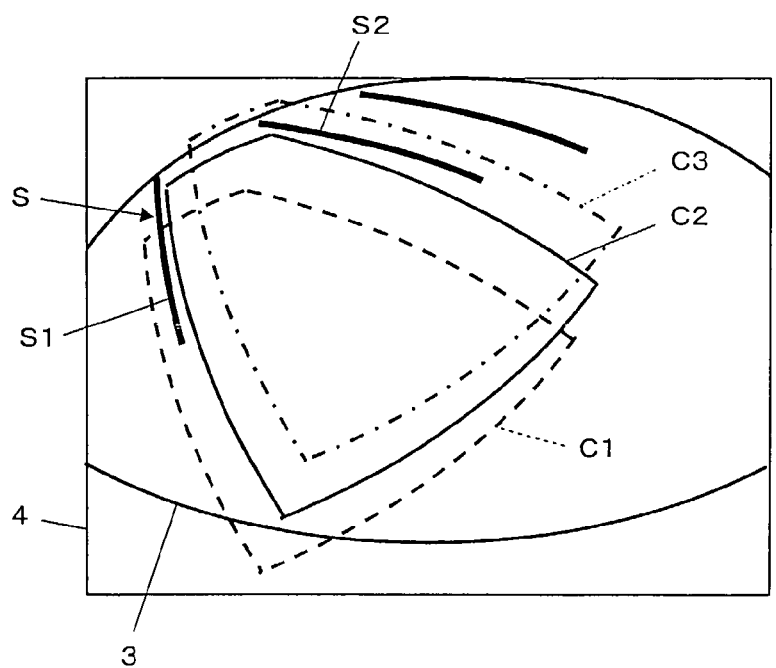
FIG. 4 is a view showing an image behind the vehicle which is displayed on a display of the first embodiment.

If the driver changes the gearshift lever 5 to the reverse position at the backward movement start position B, the controller 8 senses a change operation to the reverse position by a detection signal from the gearshift sensor 11. Then, the controller 8 displays an image captured by the camera 2 as to an area behind the vehicle as well as an estimated vehicle space indicating the vehicle's arrival position in the case where the vehicle has moved backwards while maintaining a steering angle detected by the steering angle sensor 9 on the display 4 in a superimposed manner. The estimated vehicle space is displayed, for example, in the form of a vehicle mark representing a contour of an overall external shape of the vehicle 1, at a position where the vehicle 1 is situated after having made a turn by a turning angle (90°−θ) (target turning angle) from the current position with the steering wheel 7 at the current steering angle. That is, as shown in FIG. 4, an image captured by the rear view surveillance camera 2 as to an area behind the vehicle 1, including the rear bumper 3 of the vehicle 1 and the target parking space S, is displayed on a screen of the display 4. The vehicle mark is also displayed on the screen of the display 4 in a transitional manner according to the steering angle of the steering wheel 7, for example, as indicated by C1 to C3. It should be noted herein that the vehicle marks C1, C2, and C3 respectively represent a state where the vehicle 1 is situated after having made a turn by the angle (90°−θ) from the backward movement start position B with turning radii R1, R2, and R3. Note that, in this embodiment, the arrival position coincides with the vehicle mark as the estimated vehicle space, and also indicates a longitudinal direction of the arrival position.

The driver operates the steering wheel 7 so as to establish a suitable positional relation between the estimated vehicle space and the target parking space S on the display 4. Referring to FIG. 3, the vehicle mark C1 as the estimated vehicle space with the turning radius R1 crosses the front frame line S1 of the target parking space S and thus implies an excessively large steering angle of the steering wheel 7, and the vehicle mark C3 with the turning radius R3 crosses a rear frame line S2 of the target parking space S and thus implies an excessively small steering angle of the steering wheel 7. The vehicle mark C2 with the turning radius R2 is suitably positioned with respect to the target parking space S.

Thus, while following the audio guidance issued from the aforementioned speaker 13, the driver moves the vehicle 1 slowly backwards with the steering wheel 7 fixed at such a steering angle as to cause the vehicle mark C2 to be displayed. While the vehicle 1 is moving backwards, the position of the vehicle mark C2 is displayed on the display 4 in a momentarily shifting manner so as to keep a mutual relation between the target parking space S and the vehicle mark C2 unchanged.

Figure 5:
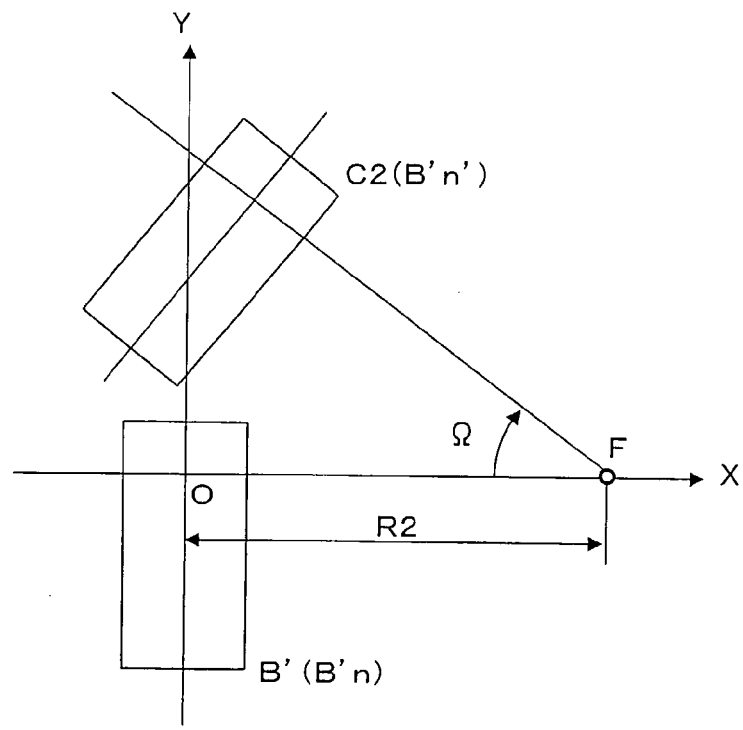
FIG. 5 is a view showing how to draw a vehicle mark which changes in position from moment to moment in the first embodiment.

For example, given that the vehicle 1 has turned from the backward movement start position B with the turning radius R2 and by an angle φ, the vehicle mark C2 is drawn by connecting points (B'n') which are obtained by rotating respective points (B'n) constituting the contour of the vehicle 1 at a current position B' around a point F serving as a rotational center (with the radius R2) by a turning angle Ω(=90°−θ−φ), in the case where a coordinate system is adopted in which an origin point O coincides with a current center of a rear axle of the vehicle 1, a Y-axis extends backwards with respect to the vehicle 1, and an X-axis extends perpendicularly to the Y-axis and leftwards with respect to the vehicle 1 as shown in FIG. 5.

When parking the vehicle 1 on the right side, the following equations are established.

$$XB'n'=(XB'n+R2)\cdot\cos(\Omega)-YB'n\cdot\sin(\Omega)-R2$$

$$YB'n'=(XB'n+R2)\cdot\sin(\Omega)+YB'n\cdot\cos(\Omega)$$

When parking the vehicle 1 on the left side, the following equations are established.

$$XB'n'=(XB'n-R2)\cdot\cos(-\Omega)-YB'n\cdot\sin(-\Omega)+R2$$

$$YB'n'=(XB'n-R2)\cdot\sin(-\Omega)+YB'n\cdot\cos(-\Omega)$$

Using those equations, the vehicle mark C2 is repeatedly drawn from moment to moment in accordance with a current turning angle and a current steering angle.

As described above, the vehicle mark C2 is displayed on the display 4 variably from moment to moment such that no change is caused in a relationship between the vehicle mark C2 and the target parking space S. However, under the influence of an inclination, irregularities, and the like of a road surface, the position of the vehicle mark C2 may deviate from the target parking space S while the vehicle 1 is moving backwards.

Figure 6:
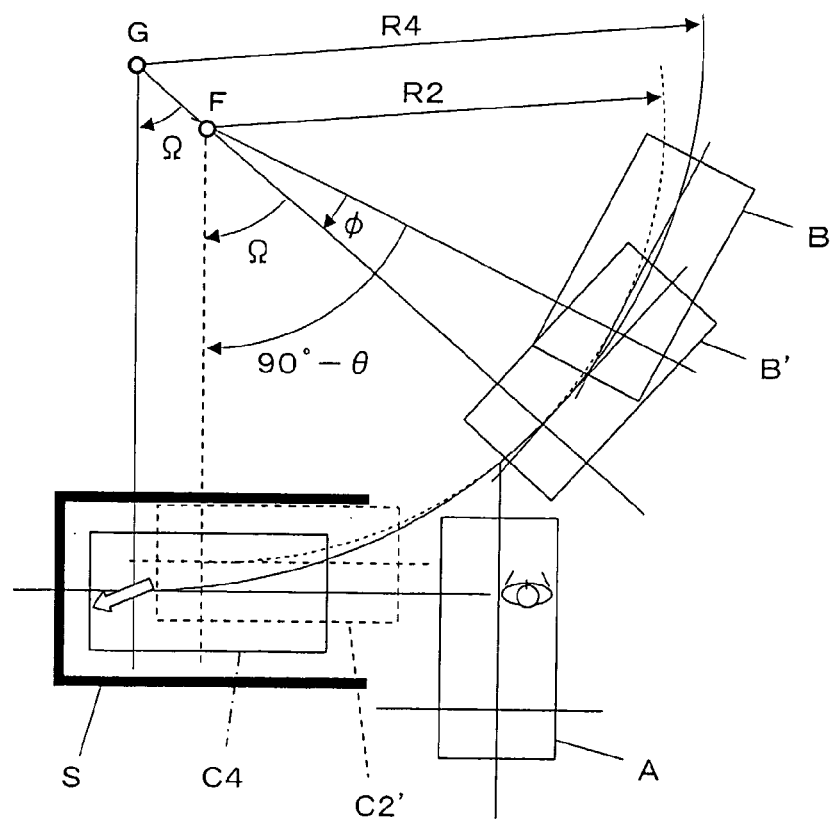
FIG. 6 is a view showing a method of adjusting a steering angle with respect to a vehicle mark whose position has deviated during a turn in the first embodiment.

For example, at the backward movement start position B, the vehicle mark C2 is located at the center of the target parking space S. When the vehicle mark C2 has deviated from the center of the target parking space S as indicated by a vehicle mark C2' at the current position B', which is assumed by the vehicle 1 after making a turn from the backward start position B with the turning radius R2 and by the angle φ, as shown in FIG. 6, the vehicle mark C2' is shifted on the display 4 by adjusting the steering angle of the steering wheel 7 and changing the turning radius from R2 to R4 to shift the turning center from the point F to a point G. As a result, a vehicle mark C4 is located at the center of the target parking space S.

The vehicle 1 may be moved backwards with the adjusted steering angle of the steering wheel 7 maintained. The controller 8 repeatedly draws the vehicle mark C4 from moment to moment in accordance with the adjusted steering angle and a current turning angle.

The controller 8 calculates a yaw angle of the vehicle 1 based on an angular speed inputted from the yaw rate sensor 10. When the change in the yaw angle from the initial stop position A has become 90°, the controller 8 can recognize that the vehicle 1 has reached the position of the vehicle mark C2 or C4. The controller 8 provides an acoustic guidance to urge the driver to stop the vehicle 1 at a suitable timing before or after the vehicle 1 reaches the position of the vehicle mark C2 or C4, and displays vehicle width lines corresponding to the locus of the vehicle 1 during straight backward movement thereof when the vehicle 1 is about to reach the position of the vehicle mark C2 or C4. Referring to the vehicle width line displayed on the display 4 in a state of being superimposed on the target parking space S, the driver finely adjusts the stop position and stops the vehicle 1 at a suitable position where the vehicle 1 is parallel to the target parking space S.

The controller 8 recognizes the arrival of the vehicle at the vehicle mark C2 or C4 upon detecting that the yaw angle has become 90°, namely, that the vehicle has reached a target turning angle after having made a turn from the backward movement start position B. The controller 8 causes the speaker 13 to issue audio guidance such as "Please straighten the steering wheel and move the vehicle backwards to an appropriate position to end parking.", and completes a lateral parking guiding operation.

The driver moves straight backwards according to the audio guidance while paying attention on the surrounding circumstances, stops the vehicle at an appropriate position within the target parking space S referring to a relation with an adjacent vehicle and an image displayed on the display 4 as to an area behind the vehicle, and thereby completes a driving operation.

Lateral parking in the target parking space S is thus completed. Now a method of recognizing the backward movement start position B which is a region from which the vehicle can reach the target parking space S will be described.

Recognition of the backward movement start position B is based on fulfillment of the following two conditions J1 and J2.

The condition J1 is that the center line of the vehicle 1 is not located gyrationally outside the center line of the target parking space S if the vehicle 1 moves backwards at a maximum steering angle (i.e., with a minimum turning radius).

The condition J2 is that a part of the vehicle 1 does not enter gyrationally inside with respect to the target parking space S when the vehicle 1 moves backwards to enter the target parking space S.

Condition J1

Figure 7:
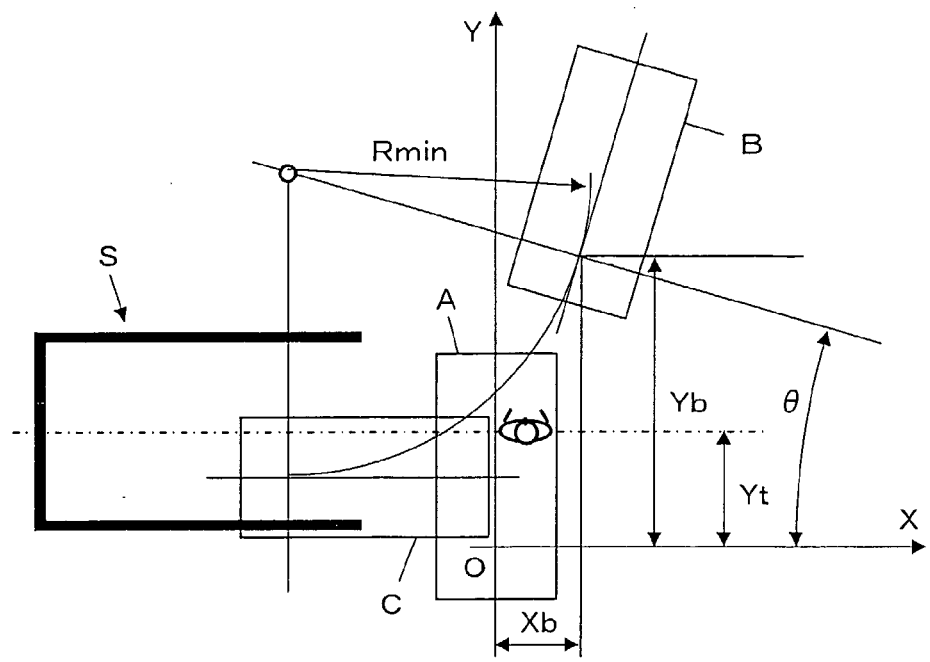
FIGS. 7 and 8 are views schematically showing a method of recognizing a backward movement start position in the first embodiment, respectively.

A description will be made with reference to FIG. 7. Taking the center of a rear axle of the initial stop position A as an origin point O, the Y-axis extends in a forward direction of the vehicle, and the X-axis extends in a rightward direction of the vehicle. The center line of the vehicle 1 is located gyrationally outside the center line of the target parking space S in moving backwards from the backward movement start position B with a minimum turning radius if the following relation is established.

$$R\min \times (1-\sin \theta) > Yb - Yt \quad (1)$$

It is assumed herein that

Rmin represents a minimum turning radius of the center of the rear axle of the vehicle 1, θ represents a yaw angle at the backward movement start position B (given that the yaw angle is 0 at the initial stop position A), Yb represents a distance covered by the center of the rear axle in the Y-axis direction from the initial stop position A to the backward movement start position B, and Yt represents a (signed) distance covered by the center of the rear axle in the Y-axis direction from the center of the target parking space S to the initial stop position A.

The minimum turning radius Rmin and the distance Yt in the Y-axis direction can be defined as constants by judging vehicle parameters and typical parking spaces. Therefore, if the distance Yb in the Y-axis direction and the yaw angle θ are obtained when the vehicle 1 runs from the initial stop position A to the backward movement start position B, it is possible to determine whether or not the above expression (1) is satisfied.

In other words, the condition J1 is satisfied when the following relation is established.

$$Yb > R\min \times (1-\sin \theta) + Yt \quad (1')$$

Condition J2

Figure 8:
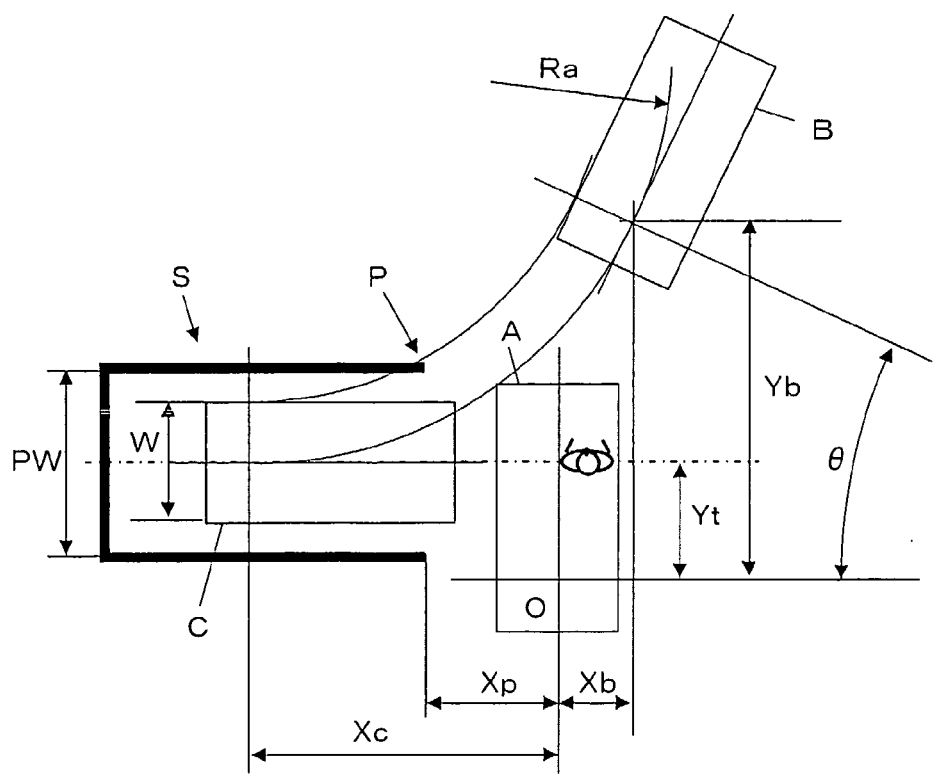

As shown in FIG. 8, when a part of the vehicle 1 just abuts on a front corner portion P of the target parking space S in entering the target parking space S after having moved backwards from the backward movement start position B, the following relations are established given that an origin point is represented at the center of the rear axle of the vehicle 1 at the initial stop position A.

$$Ra \times (1-\sin \theta) = Yb - Yt \quad (2)$$

$$(Ra - W/2)^2 = (Xc - Xp)^2 + (Ra - PW/2)^2 \quad (3)$$

$$Ra \times \cos \theta = Xb + Xc \quad (4)$$

It is assumed herein that

Ra represents a turning radius of the center of the rear axle of the vehicle 1,

θ represents a yaw angle at the backward movement start position B (given that the yaw angle is 0 at the initial stop position A), Xb represents a distance covered by the center of the rear axle in the X-axis direction from the initial stop position A to the backward movement start position B, Yb represents a distance covered by the center of the rear axle in the Y-axis direction from the initial stop position A to the backward movement start position B, Yt represents a (signed) distance covered by the center of the rear axle in the Y-axis direction from the center of the target parking space S to the initial stop position A, Xp represents a distance covered by the center of the rear axle in the X-axis direction from an entrance end of the target parking space S to the initial stop position A, Xc represents a distance covered by the center of the rear axle in the X-axis direction from the initial stop position A to the vehicle mark C, PW represents a width of the target parking space S, and W represents a width of the vehicle 1.

Xc derived from the equation (4) is assigned to the equation (3) to obtain an equation (3'). Then, Ra derived from the equation (2) is assigned to the equation (3') to obtain an equation (3") which is an equation including θ, Xb, and Yb as variables.

The equation (3") is schematically expressed as follows.

$$Xb = F(\theta, Yb, Kn) \tag{3''}$$

It should be noted herein that F represents a predetermined function and Kn represents all the necessary constants.

Therefore, the condition J2 is satisfied when the following relation is established.

$$Xb > F(\theta, Yb, Kn) \tag{3'''}$$

The backward movement start position B satisfying both the expression (1') of the condition J1 and the expression (3''') of the condition J2 is recognized as a backward movement start position B complying with the conditions J1 and J2. As is apparent from the expressions (1') and (3'''), if one of the values for Xb, Yb, and θ is determined, possible ranges of the other values are determined. In the first embodiment, a description will be made on the assumption that possible ranges of Xb and Yb with the determined yaw angle θ of the vehicle represent the backward movement start position B.

Figure 9:
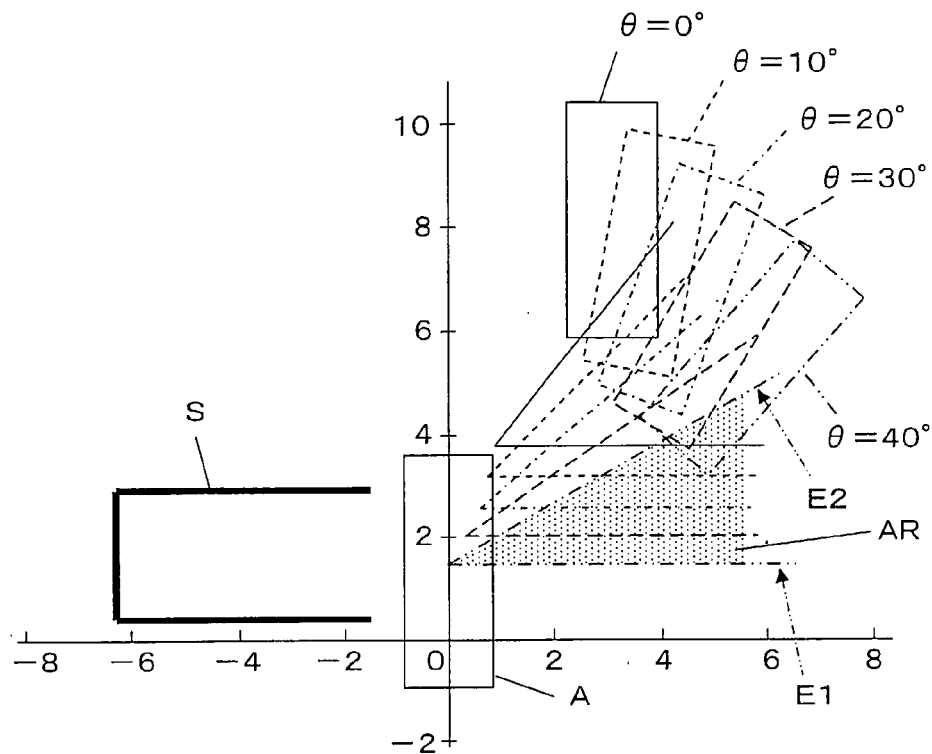
FIG. 9 is a view showing a backward movement start position in the first embodiment.

This backward movement start position B is specifically illustrated in FIG. 9. When θ=40°, E1 and E2 represent boundary lines defined by the conditions J1 and J2, respectively. When the center of the rear axle of the vehicle 1 is located within a region AR between the boundary lines E1 and E2, the vehicle 1 is at the backward movement start position B. Referring to FIG. 9, in addition to the case of θ=40°, several regions AR corresponding to various values assumed by the yaw angle θ of the vehicle 1 at the backward movement start position B are illustrated. The range of the backward movement start position B is thus calculated according to the yaw angle θ of the vehicle 1.

In the first embodiment as described above, the condition J1 is defined on the basis of the center of the vehicle 1 and the center of the target parking space S. However, the condition J1 may also be defined on the basis of an external portion of the vehicle 1 and an external portion (S2) of the target parking space S.

In this case, the condition J1 is replaced with the following condition J1A.

The condition J1A is that the external portion of the vehicle 1 is not located gyrationally outside with respect to the external portion (S2) of the target parking space S if the vehicle 1 moves backwards at a maximum steering angle (i.e., with a minimum turning radius).

The expression changes form the expression (1) to the following expression.

$$R\min \times (1-\sin\theta) + W/2 > Yb - Yt + PW/2 \tag{1A}$$

Therefore, a condition satisfying the condition J1A is not the expression (1') but the following expression.

$$Yb > R\min \times (1-\sin\theta) + W/2 + Yt - PW/2 \tag{1A'}$$

Second Embodiment

In the first embodiment of the present invention, as shown in FIG. 3, the turning radius changes when the steering wheel 7 is operated at the backward movement start position B to change the steering angle. Therefore, the vehicle mark as an estimated vehicle space coincides with the longitudinal direction of a position reached by the vehicle 1. As a result, the vehicle mark shifts not only in the width direction of the target parking space S but also in the longitudinal direction of the target parking space S. In a second embodiment of the present invention, therefore, the longitudinal position of the vehicle mark is displayed in a fixed manner regardless of the steering angle detected by the steering angle sensor 9, that is, regardless of the longitudinal position of the position reached by the vehicle 1.

Figure 10:
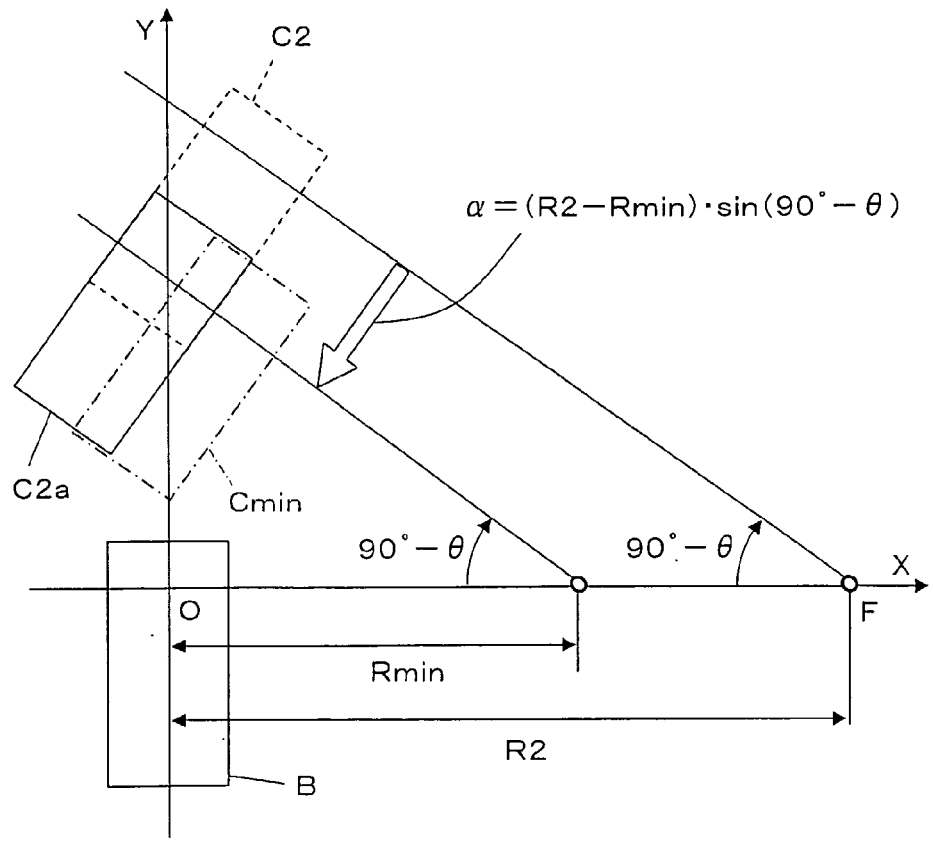
FIGS. 10 to 14 are views showing how to draw a vehicle mark in second to sixth embodiments of the present invention, respectively.

For example, a position Cmin, which is assumed by making a turn from the backward movement start position B with a minimum turning radius Rmin and by an angle (90°−θ), is defined as a longitudinal reference position of the vehicle mark in the case where a coordinate system is adopted in which an origin point O coincides with a center of a rear axle of the vehicle 1 at the backward start position B as a current vehicle position, a Y-axis represents a direction extending backwards with respect to the vehicle 1, and an X-axis represents a direction extending perpendicularly to the Y-axis and leftwards with respect to the vehicle as shown in FIG. 10. The longitudinal position of the vehicle mark can always be made to coincide with the position assumed by making a turn with the minimum turning radius Rmin even when the actual turning radius is not equal to the minimum turning radius Rmin. A longitudinal offset amount α of the vehicle mark C2 with respect to the reference position Cmin in making a turn from the backward movement start position B by the angle (90°−θ) is expressed as follows when the actual turning radius is R2.

$$\alpha = (R2 - R\min) \cdot \sin(90° - \theta)$$

In view of the foregoing, if the vehicle mark C2 is offset by α in the longitudinal direction of the vehicle to display a vehicle mark C2a by means of the controller 8, the display position of the vehicle mark can be prevented from deviating longitudinally regardless of the actual steering angle. Thus, the driver finds it easy to position the vehicle at the center of the target parking space S by shifting the vehicle mark on the display 4 at the backward movement start position B, and as a result, can park the vehicle 1 more accurately.

Third Embodiment

Figure 11:
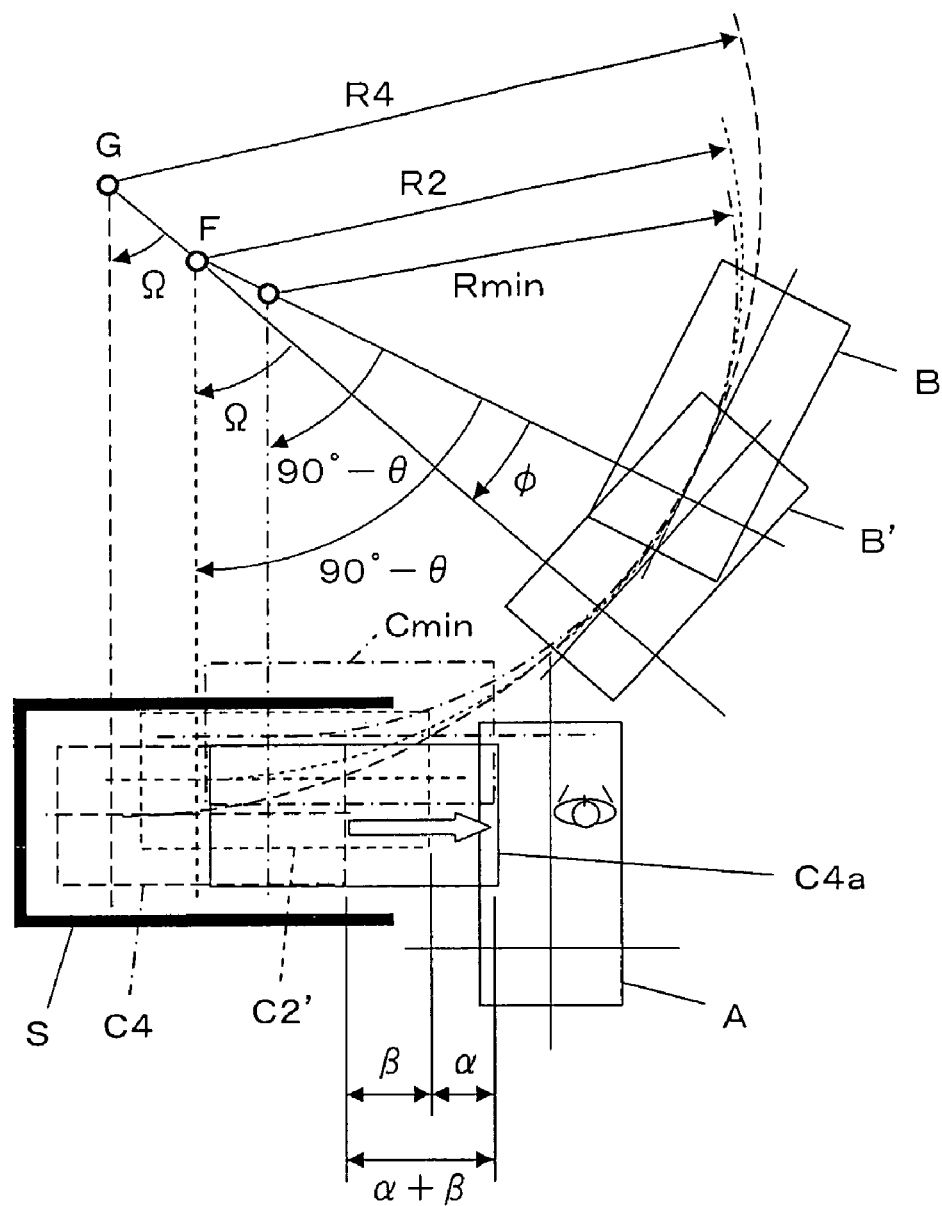

In the second embodiment of the present invention, the vehicle mark does not shift in the longitudinal direction of the target parking space S even when the steering wheel 7 is further operated to change the steering angle while making a turn from the backward movement start position B. As a result, the vehicle mark can be displayed at the same longitudinal position as the reference position Cmin in making a turn with the minimum turning radius Rmin. As shown in FIG. 11, when the steering angle is adjusted to change the turning radius from R2 to R4 at the position B' which is assumed by making a turn from the backward movement start position B around a turning center F with the turning radius R2 and by the angle φ, the amount of change in the turning radius is (R4−R2). Therefore, a longitudinal offset amount β of the vehicle mark C4 in making a turn by the angle Ω=(90°−θ−φ) after a change in the turning radius with respect to the vehicle mark C2' in making a turn from the backward movement start position B with the turning radius R2 and by the angle (90°−θ) is expressed as follows.

$$\beta = (R4 - R2) \cdot \sin\Omega$$

In view of the foregoing, if the vehicle mark C4 is offset by β in the longitudinal direction of the vehicle 1, the longitudinal position thereof coincides with that of the vehicle mark C2'. It should be noted herein that the offset amount with respect to the reference position Cmin of the vehicle mark C2' is α, namely, the same value as the offset amount with respect to the reference position Cmin of the vehicle mark C2 described in the second embodiment. Therefore, if the vehicle mark C4 is offset by ($\alpha+\beta$) in the longitudinal direction of the vehicle to display a vehicle mark C4a by means of the controller 8, the vehicle mark can be displayed at the same longitudinal position as the reference position Cmin in making a turn with the minimum turning radius Rmin. In this case as well, the driver finds it easy to position the vehicle 1 at the center of the target parking space S by shifting the vehicle mark on the display 4 at the backward movement start position B, and as a result, can park the vehicle 1 more accurately.

Fourth Embodiment

Figure 12:
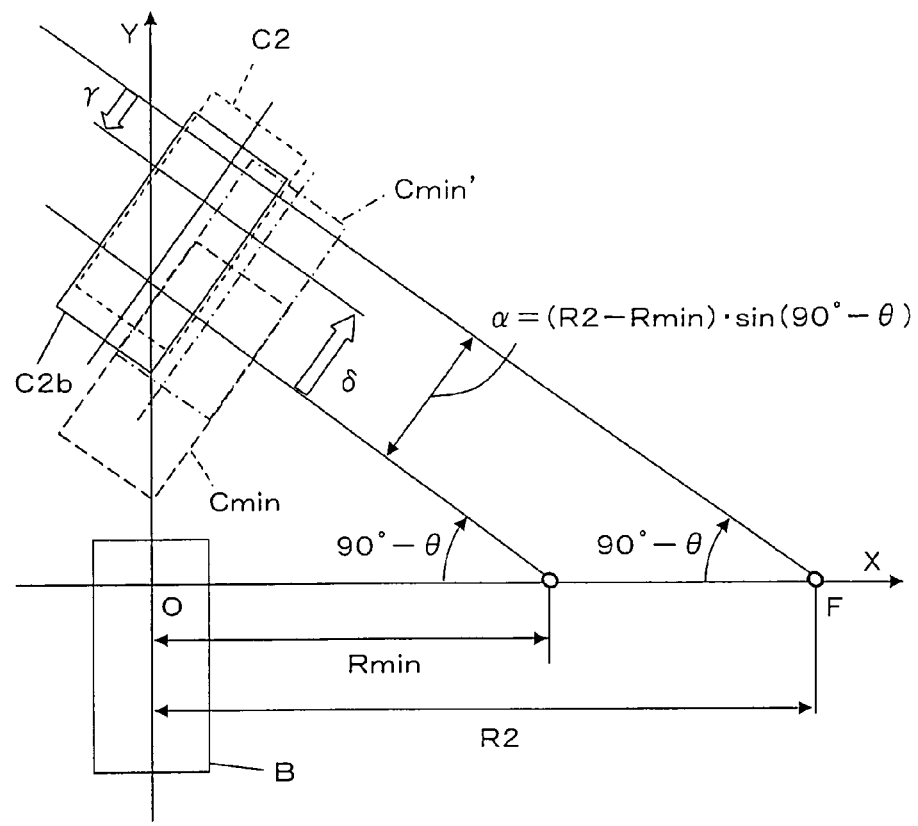

In the second to third embodiments of the present invention, it is also possible to determine an offset value $\delta$ (e.g., 3 m) in advance and set a reference position Cmin' as a position which is obtained by shifting backwards by $\delta$ the position Cmin in making a turn with the minimum turning radius Rmin. For example, when the actual turning radius is R2, it is appropriate to offset the vehicle mark C2 in the longitudinal direction of the vehicle by an offset amount $\gamma$ expressed in the following expression by means of the controller 8 and display a vehicle mark C2b as shown in FIG. 12.

$$\Upsilon = \alpha - \delta$$
$$= (R2 - R\min) \cdot \sin(90° - \theta) - \delta$$

Furthermore, it is also possible to dispose a jog or the like in a driver seat so that the offset value $\delta$ can be changed.

In this case, the driver finds it easy to position the vehicle 1 at the center of the target parking space S by shifting the vehicle mark on the display 4 at the backward movement start position B, and as a result, can park the vehicle more accurately. In addition, except when moving the vehicle 1 backwards with the minimum turning radius Rmin, the driver does not feel a strong sense of incongruity because the discrepancy between the vehicle mark and the position actually reached by the vehicle 1 is small.

Fifth Embodiment

Figure 13:
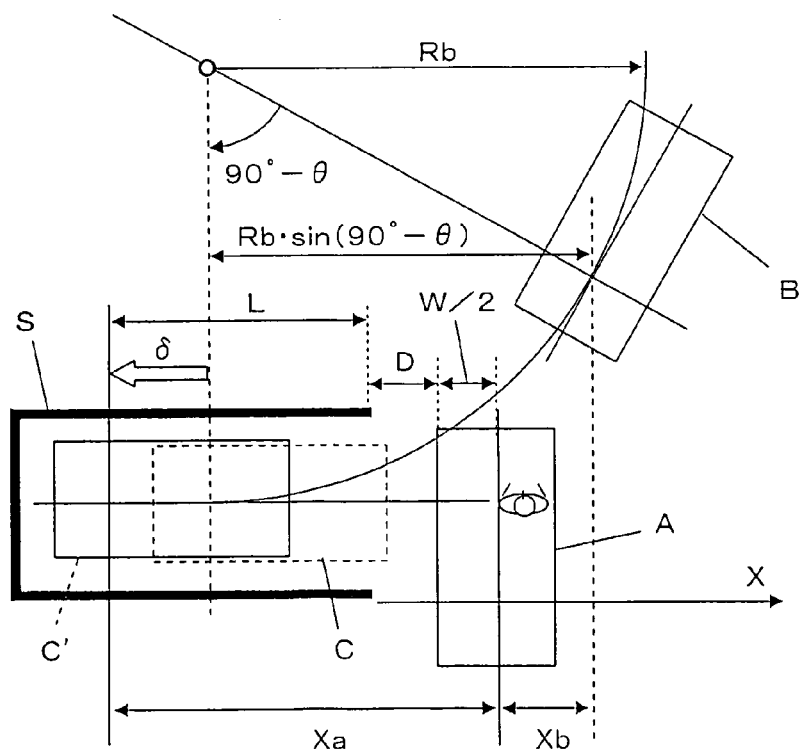

In a fifth embodiment of the present invention, the longitudinal position of the vehicle mark is displayed in a fixed manner regardless of the steering angle detected by the steering angle sensor 9. As shown in FIG. 13, a positional relationship among the initial stop position A, the target parking space S, and a vehicle mark C' to be displayed is determined in advance. The target parking space S is as large as a parking space of a general parking lot. For example, given that the spacing between an entrance of the target parking space S and the initial stop position A is denoted by reference symbol D, that the distance from the entrance of the target parking space S to the center of the rear axle of the vehicle mark C' to be displayed is denoted by reference symbol L, and that the width of the vehicle 1 is denoted by reference symbol W, the distance Xa in the X-axis direction from a centerline of the vehicle 1 at the initial stop position A to the center of the rear axle of the vehicle mark C' to be displayed is expressed as follows.

$$Xa = L + D + W/2$$

A moving amount of the center of the rear axle in the direction of the X-axis in making a turn from the backward movement start position B with a turning radius Rb and by the angle (90°−θ) to reach the vehicle mark C is $Rb \cdot \sin(90°-\theta)$.

Therefore, given that the moving amount of the center of the rear axle in the direction of the X-axis is denoted by reference symbol Xb, the offset value $\delta$ of the vehicle mark C' with respect to the vehicle mark C is expressed as follows.

$$\delta = Xa + Xb - Rb \cdot \sin(90°-\theta)$$

In other words, the display position of the vehicle mark C' is determined in consideration of the depth of the parking space S, using the positional relationship between the initial stop position A and the target parking space S.

In view of the foregoing, if the moving amount Xb of the center of the rear axle is calculated by measuring a yaw angle and a steering angle from moment to moment from the initial stop position A to the backward movement start position B, and the vehicle mark C' is displayed by offsetting the vehicle mark C, which is calculated based on the turning radius Rb and the turning angle (90°−θ) from the backward movement start position B, by the above-mentioned offset value $\delta$ in the longitudinal direction of the vehicle, the longitudinal position of the vehicle mark C' is always displayed in a fixed manner in the target parking space S. In this case, the discrepancy between the vehicle mark and the position actually reached by the vehicle 1 is smaller in comparison with the fourth embodiment of the present invention.

Sixth Embodiment

Figure 14:
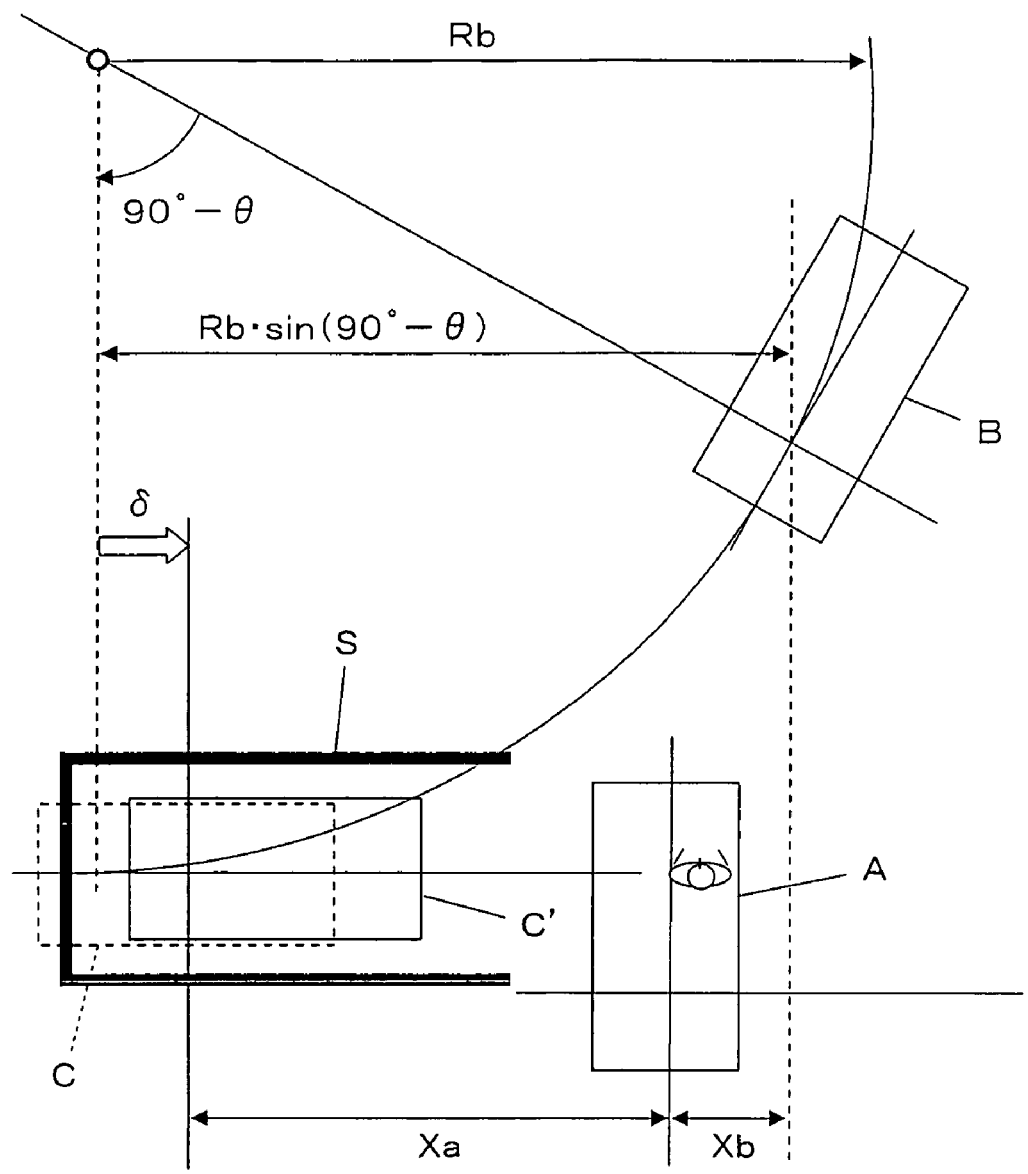

In the fifth embodiment mentioned above, when a relation: $Rb \cdot \sin(90°-\theta) > Xa + Xb$ is established because of the large turning radius Rb from the backward movement start position B as shown in FIG. 14, there is a fear that the vehicle mark C as an actual parking completion position protrudes backwards from the target parking space S even if the vehicle mark C' is displayed in the target parking space S.

In view of the foregoing, when it is determined that the position of the vehicle 1 in completing the parking thereof protrudes backwards from the vehicle mark C' displayed as an estimated vehicle space, the controller 8 displays the vehicle mark C' in a color different from a normal display color. A warning can thereby be issued to the driver.

Instead of changing the color of the vehicle mark C', the vehicle mark C' may be displayed after having been extended to the position of the vehicle mark C where the vehicle 1 is actually positioned at the time of the completion of parking.

In combination with these measures, an acoustic warning can also be issued to the driver from the speaker 13.

Seventh Embodiment

Figure 15:
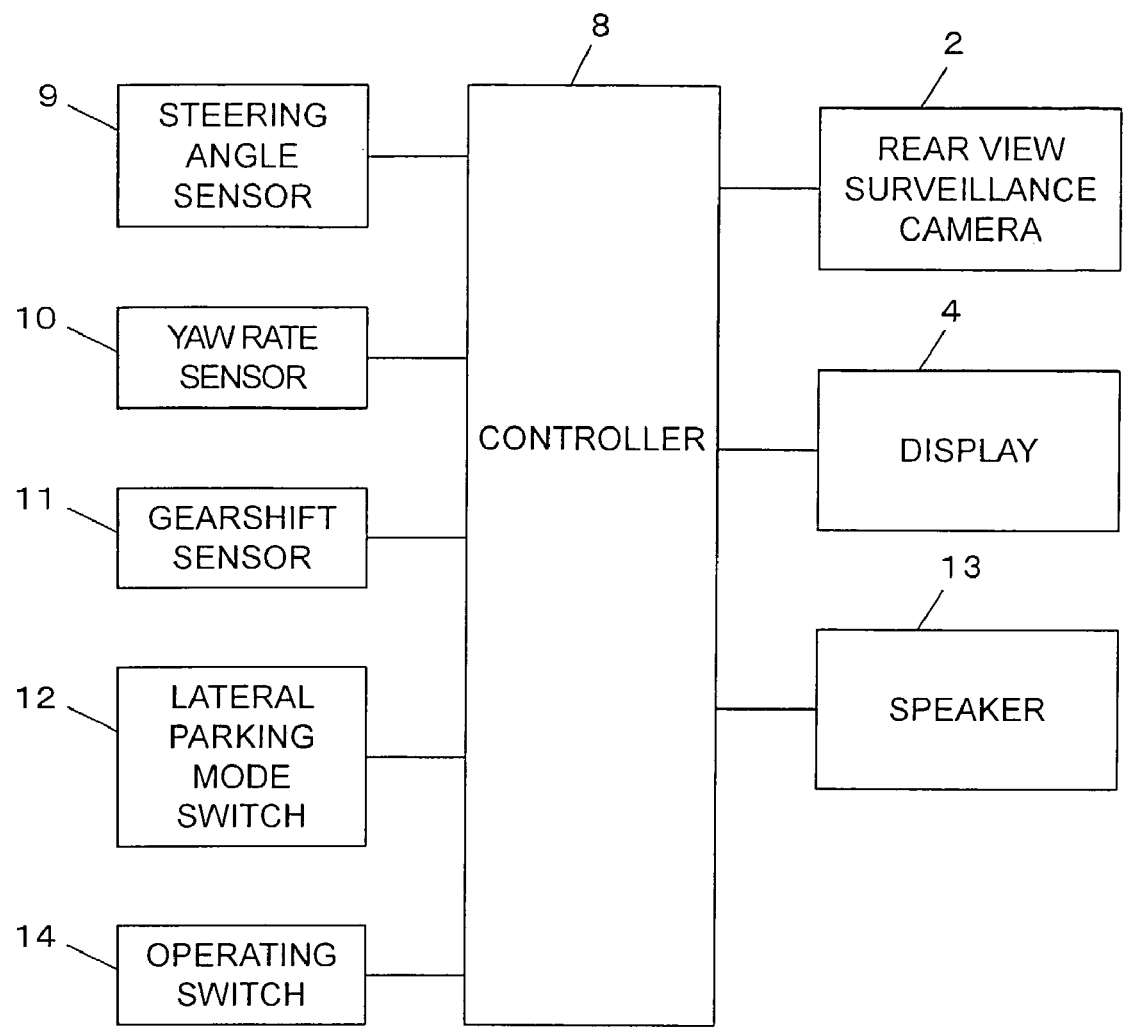
FIG. 15 is a block diagram showing a configuration of a parking assistance apparatus according to a seventh embodiment of the present invention.

FIG. 15 shows a configuration of a parking assistance apparatus according to a seventh embodiment of the present invention. In the seventh embodiment, an operating switch 14 is provided in the driver seat and connected to the controller 8 in the parking assistance apparatus of the first embodiment shown in FIG. 2. When the vehicle 1 stopped at the initial stop position A is not perpendicular to the target parking space S, there is a fear that a suitable positional relationship is not established between the vehicle mark displayed on the display 4 and the target parking space S even if the steering wheel 7 is operated at the backward movement start position B. In view of this situation, in the seventh embodiment, the parking assistance apparatus is arranged such that the angle of the vehicle mark displayed on the display 4 can be changed by operating the operating switch 14 disposed in the driver seat. That is, in this case, the controller 8 increases or reduces the turning angle in making a backward turn from the backward movement start position B to the vehicle mark with respect to the angle (90°−θ) in the case where the vehicle 1 is perpendicular to the target parking space S, in accordance with the change in the angle of the displayed vehicle mark. In this manner, more accurate parking guidance can be provided in accordance with the inclination of the vehicle 1 at the initial stop position A.

Eighth Embodiment

Figure 16:
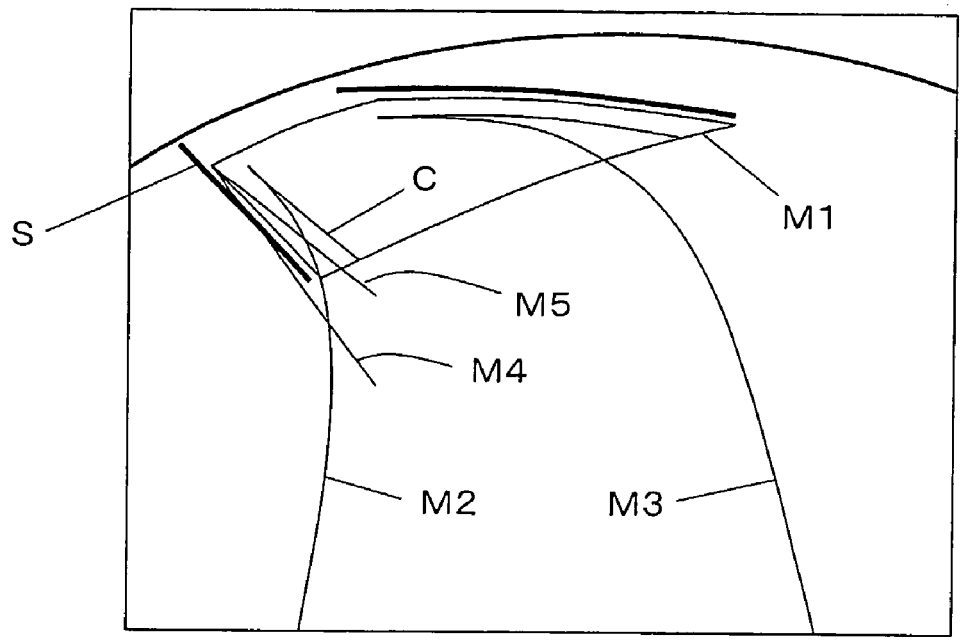
FIGS. 16 and 17 are views showing images behind a vehicle which are displayed on a display of eighth and ninth embodiments of the present invention, respectively.

As shown in FIG. 16, a parking frame mark M1 indicating a frame width of the target parking space S can also be displayed on the display 4 in a state of being superimposed on the vehicle mark C as an estimated vehicle space by means of the controller 8. As is the case with the vehicle mark C, the parking frame mark M1 shifts on the display 4 in accordance with the steering angle. In this manner, the vehicle mark C and the parking frame mark M1 can be easily matched to the target parking space S by operating the steering wheel 7.

As shown in FIG. 16, when the vehicle 1 makes a backward turn from the backward movement start position B to the target parking space S, a locus M2 of the vehicle 1 on the inside of the turn to the target parking space S and a locus M3 of the vehicle 1 on the outside of the turn to the target parking space S can also be displayed based on the steering angle detected by the steering angle sensor 9 by means of the controller 8. In this manner, a backward movement path of the vehicle 1 can be confirmed on the display 4, and a risk of interfering with some obstacle during backward movement of the vehicle 1 can be estimated, so a feeling of security is ensured. The backward movement path of the vehicle 1 can also be confirmed even when only one of the locus M2 of the vehicle 1 on the inside of the turn and the locus M3 of the vehicle 1 on the outside of the turn is displayed.

Furthermore, as shown in FIG. 16, an auxiliary mark M4 indicating an angle of the parking frame mark in stopping the vehicle 1 at a position that is still short of the turning angle (90°−θ) by a predetermined angle ω (e.g., 3°) with respect to the target parking space S while making a backward turn from the backward movement start position B to the target parking space S, and an auxiliary mark M5 indicating an angle of the parking frame mark in stopping the vehicle 1 at a position that is beyond the turning angle (90°−θ) by the predetermined angle ω can be displayed by means of the controller 8. In this manner, even when the vehicle 1 stopped at the initial stop position A is not perpendicular to the target parking space S, the vehicle mark C is parallel or substantially parallel to one of the auxiliary marks M4 and M5. Therefore, the vehicle mark C can be easily matched to the target parking space S.

Ninth Embodiment

Figure 17:
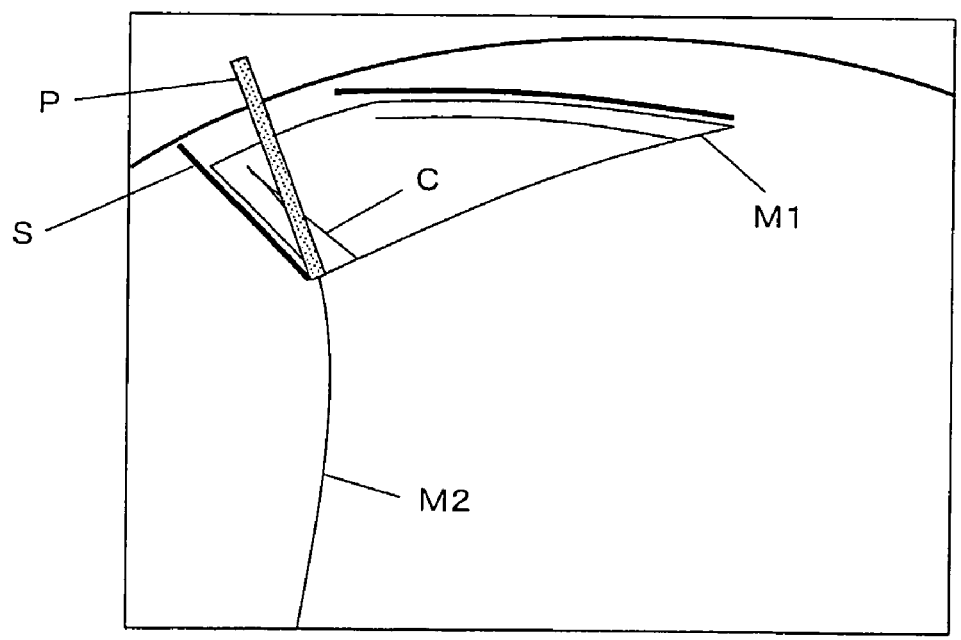

As shown in FIG. 17, a pole P set up at an intersection of a front end of the target parking space S and the locus M2 of the vehicle 1 on the inside of the turn can also be displayed by means of the controller 8. The pole P is displayed upright with respect to a road surface. When such a pole P is displayed, a risk of interfering with a vehicle or the like which is parked in an adjacent target parking space can be estimated, so a feeling of security is ensured.

Tenth Embodiment

Figure 18:
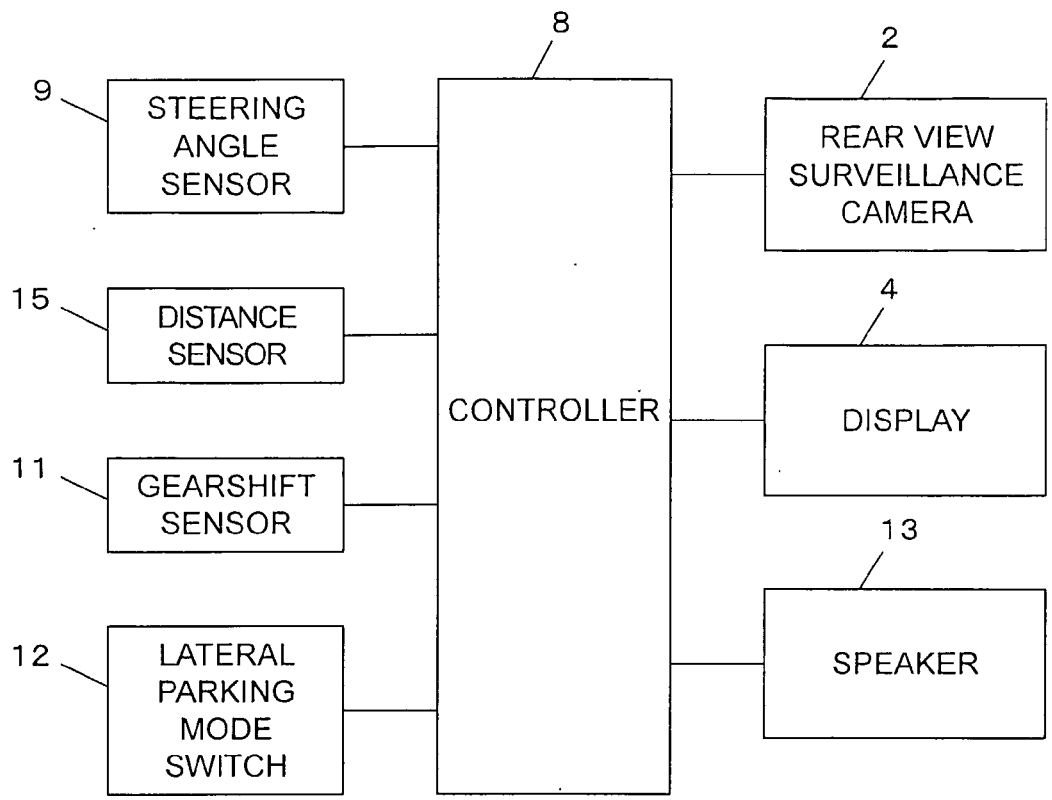
FIG. 18 is a block diagram showing a configuration of a parking assistance apparatus according to a tenth embodiment of the present invention.

Although a yaw angle of the vehicle 1 is calculated by integrating an angular speed of the vehicle 1 input from the yaw rate sensor 10 in the first to ninth embodiments as described above, this is not obligatory. As shown in FIG. 18, it is also possible to install a distance sensor 15 instead of the yaw rate sensor 10 and calculate a yaw angle of the vehicle 1 based on a steering angle obtained from the steering angle sensor 9 and a moving distance of the vehicle 1 obtained from the distance sensor 15 to provide the driver with guiding information.

Eleventh Embodiment

In the first to tenth embodiments mentioned above, lateral parking has been described. However, the present invention is also applicable during a final backward movement operation in the case where parallel parking of the vehicle 1 in the target parking space S is performed by moving the vehicle 1 forwards from the initial stop position A, which is in a predetermined positional relationship with the target parking space S, with the steering wheel 7 turned, stopping the vehicle 1 at the backward movement start position B, moving the vehicle 1 backwards with the steering wheel 7 turned reversely thereto, and moving the vehicle 1 backwards with the steering wheel 7 turned again reversely thereto.

Figure 19:
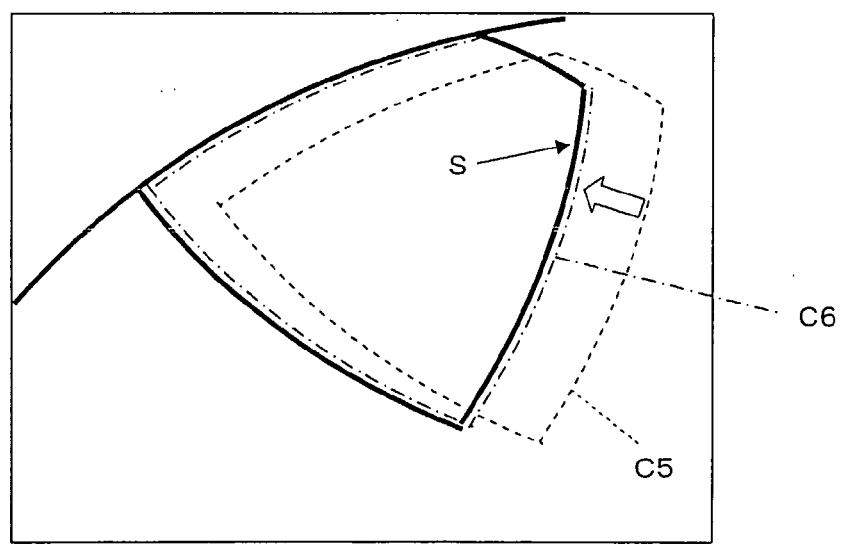
FIG. 19 is a view showing an image behind a vehicle which is displayed on a display of an eleventh embodiment of the present invention.

That is, the controller 8 calculates a momentary yaw angle by integrating a momentary angular speed, calculates a turning radius from a momentary steering angle, integrates a moving amount of the vehicle 1 on the assumption that the vehicle 1 moves in that state by a change in the momentary yaw angle, and calculates a current relative position of the vehicle 1 with respect to the initial stop position A. Then, during the final backward movement operation, the vehicle mark in moving the vehicle 1 backwards while maintaining the steering angle detected by the steering angle sensor 9 is displayed on the display 4 in a superimposed manner. The vehicle mark is displayed in a shifting manner in accordance with the steering angle of the steering wheel 7. As shown in FIG. 19, the driver operates the steering wheel 7 to shift a vehicle mark C5 on the display 4 to a vehicle mark C6, which is in a suitable positional relationship with the target parking space S. It is appropriate to move the vehicle 1 slowly backwards in this state. While the vehicle 1 is moving backwards, the position of the vehicle mark C6 is variably displayed from moment to moment such that the mutual relationship between the target parking space S and the vehicle mark C6 does not change.

If the vehicle mark C6 has deviated from the target parking space S while the vehicle 1 is moving backwards, the steering angle of the steering wheel 7 is adjusted such that the vehicle mark C6 is shifted on the display 4 and establishes a suitable positional relationship with the target parking space S. It is appropriate to move the vehicle 1 backwards with the adjusted steering angle of the steering wheel 7 maintained. The controller 8 repeatedly draws the vehicle mark C6 from moment to moment in accordance with the adjusted steering angle and a current turning angle.

Other Embodiments

Instead of throwing the lateral parking mode switch 12 at the initial stop position A in the first to tenth embodiments, the lateral parking mode switch 12 may be thrown on the way that the vehicle 1 moves straight forwards toward the initial stop position A, and the controller 8 may recognize that the vehicle 1 is at the initial position by detecting a change in the yaw angle of the vehicle 1 when the vehicle 1 moves forwards from the initial stop position A toward the backward movement start position B while making a turn with the steering wheel 7 being turned. Instead of throwing the lateral parking mode switch 12, a microphone and a voice recognition unit may be installed for issuing commands to the controller 8 by means of voice recognition. Further, every time the vehicle stops, the controller 8 may recognize that the stopped position is the initial position. Thus, the operation performed by the driver is simplified.

Although the first to tenth embodiments deals with lateral parking on the left of a passage, lateral parking on the right side can also be performed in a similar manner.

The initial stop position A is not limited to the position 0.5 m to 1 m apart from the entrance of the target parking space S. The region AR may be calculated according to an initial stop position A determined in advance.

When the vehicle 1 stops at the initial stop position A, it is not indispensable that the center of the target parking space S is positioned right beside the driver. For instance, the driver may see the front frame line S1 of the target parking space S right beside the driver, or the driver may see the rear frame line S2 of the target parking space S right beside the driver.

One of the aforementioned three states (the vehicle 1 is located right beside the frame line S1, the frame line S2, or the center of the target parking space S) may be selected by a switch when the vehicle 1 is stopped at the initial stop position A. In this case, according to the circumstances in each parking lot, the process of parking can be initiated from an initial stop position A ensuring easier operation.

In the foregoing embodiments, the vehicle mark as the estimated vehicle space is substantially in the shape of the vehicle (rectangular shape), which also indicates the longitudinal direction of the vehicle 1. It is also appropriate, however, that the vehicle mark is in a shape which simply indicates a lateral direction of the vehicle 1.

In the first to eleventh embodiments mentioned above, a yaw angle and a steering angle may be acquired continuously from the backward movement start position B instead of acquiring a yaw angle and a steering angle continuously from the initial position. In this case, it is appropriate to stop the vehicle 1 at the backward movement start position B, which is in a predetermined positional relationship and a predetermined angular relationship with the target parking space S.

Various modified examples are also conceivable as to the predetermined positional relationship and the predetermined angular relationship with the target parking space S both in the case where a yaw angle and a steering angle are acquired continuously from the initial position and in the case where a yaw angle and a steering angle are acquired continuously from the backward movement start position B. It is appropriate as in the cases of the foregoing embodiments that predetermined values are stored in a memory of the controller 8. Alternatively, it is also appropriate that a plurality of values, which are stored as to three areas, namely, an area right beside the above-mentioned frame line S1, an area right beside the frame line S2, and an area right beside the center of the target parking space S, are selected. It is also appropriate that the driver determines those values arbitrarily and inputs them, or that values used in having parked the vehicle 1 in the past are stored and then determined in accordance with the habit of the driver. Alternatively, it is also appropriate to acquire those values by means of various sensors, measuring techniques, image processing techniques, and the like every time the driver parks the vehicle 1.

The controller 8 is not required to exist as a dedicated apparatus for parking assistance, and may be mounted in a navigation system or the like. It becomes thus possible not only to save the trouble of installing the controller 8 in the vehicle 1 but also to reduce the cost of the system for reasons of common use of a box member, common use of sensor groups, the lack of a need for wiring, and the like.

According to the present invention, the vehicle 1 can be reliably and easily parked in the target parking space S.

The invention claimed is:

1. A parking assistance apparatus for supporting a driving operation in parking a vehicle in a target parking space by moving the vehicle forwards from an initial position, which is in a predetermined positional relationship and a predetermined angular relationship with the target parking space, with a steering wheel turned, stopping the vehicle at a backward movement start position, and then moving the vehicle backwards with the steering wheel turned reversely thereto or further moving the vehicle backwards with the steering wheel turned again reversely thereto, the parking assistance apparatus comprising:

a camera for capturing an area behind the vehicle;
a display provided in a driver seat of the vehicle;
a steering angle sensor for detecting a steering angle;
yaw angle detecting means for detecting a yaw angle of the vehicle; and
a controller,
the controller acquiring a position and a yaw angle of the vehicle continuously from the initial position based on the steering angle detected by the steering angle sensor and the yaw angle of the vehicle detected by the yaw angle detecting means and displaying the image captured by the camera on the display in moving the vehicle backwards,
the controller displaying on the display in a superimposed manner an estimated vehicle space indicating at least a lateral position of the vehicle at a position reached by the vehicle in moving the vehicle backwards by a difference between a current yaw angle of the vehicle and an angle of the target parking space while a current steering angle detected by the steering angle sensor is maintained during a final backward movement operation in parking the vehicle in the target parking space; and
the controller displaying on the display in a shifting manner the estimated vehicle space based on a momentary steering angle and a momentary yaw angle of the vehicle, which result from backward movement of the vehicle, and when the steering angle is adjusted during the final backward movement operation, the controller displaying on the display in a shifting manner the estimated vehicle space in the case where the vehicle has moved backwards while maintaining a steering angle after being adjusted by a difference between a yaw angle of the vehicle at a time when the steering angle is adjusted and the angle of the target parking space.

2. A parking assistance apparatus according to claim 1, further comprising guidance means for outputting guidance information on the driving operation to a driver.

3. A parking assistance apparatus according to claim 2 for supporting a driving operation of lateral parking for parking the vehicle in the target parking space by moving the vehicle forwards from the initial position with the steering wheel turned, stopping the vehicle at the backward movement start position, and then moving the vehicle backwards with the steering wheel turned reversely thereto, wherein the controller determines whether or not the vehicle has reached the backward movement start position corresponding to a position and a yaw angle allowing the vehicle to be parked during a forward moving operation from the initial position based on a position and a yaw angle of the vehicle acquired continuously, and outputs guidance information for urging the driver to stop the vehicle via the guidance means when it is determined that the vehicle has reached the backward movement start position.

4. A parking assistance apparatus according to claim 1 for supporting a driving operation of lateral parking for parking the vehicle in the target parking space by moving the vehicle forwards from the initial position with the steering wheel turned, stopping the vehicle at the backward movement start position, and then moving the vehicle backwards with the steering wheel turned reversely thereto,
wherein the estimated vehicle space indicates a predetermined longitudinal position which does not depend on a longitudinal position of the vehicle at the position reached by the vehicle.

5. A parking assistance apparatus according to claim 4, wherein the predetermined longitudinal position is a longitudinal position in moving the vehicle backwards by the difference between the current yaw angle of the vehicle and the angle of the target parking space while a maximum steering angle is maintained during the final backward movement operation, or a position offset from the longitudinal position by a predetermined value.

6. A parking assistance apparatus according to claim 4, wherein the predetermined longitudinal position is a position determined in consideration of a depth of the target parking space on a road surface.

7. A parking assistance apparatus according to claim 4, wherein the controller issues a warning to a driver when it is determined that the position reached by the vehicle will protrude backwards from the estimated vehicle space.

8. A parking assistance apparatus according to claim 1, further comprising an operating switch for changing a difference between the current yaw angle of the vehicle and the angle of the target parking space.

9. A parking assistance apparatus according to claim 1, wherein the controller displays a parking frame mark indicating a frame width of the target parking space with the parking frame mark being superimposed on the estimated vehicle space.

10. A parking assistance apparatus according to claim 1, wherein the controller displays at least one of a locus of the vehicle on an inside of a turn to the estimated vehicle space and a locus of the vehicle on an outside of the turn to the estimated vehicle space, based on the steering angle detected by the steering angle sensor during the final backward movement operation.

11. A parking assistance apparatus according to claim 10, wherein the controller displays a pole set up on an intersection of a front end of the target parking space and the locus of the vehicle on the inside of the turn.

12. A parking assistance apparatus according to claim 1, wherein the controller displays auxiliary marks indicating angles of the vehicle in stopping short of the turning angle of the final backward movement operation by a predetermined angle with respect to the estimated vehicle space and in stopping beyond the turning angle of the final backward movement operation by a predetermined angle with respect to the estimated vehicle space.

13. A parking assistance apparatus according to claim 1, further comprising a setting switch,
the controller recognizing as the initial position a position of the vehicle at a time when the setting switch is pressed during stoppage of the vehicle or at a time when a change in steering angle is detected by the steering angle sensor after the setting switch has been pressed during movement of the vehicle.

14. A parking assistance apparatus according to claim 1, wherein the yaw angle detection means is constituted by a yaw rate sensor.

15. A parking assistance apparatus according to claim 1, wherein the yaw angle detection means is constituted by a distance sensor for measuring a moving distance of the vehicle and the steering angle sensor.

16. A parking assistance apparatus according to claim 2, wherein the guiding means is constituted by a speaker.

17. A parking assistance apparatus for supporting a driving operation in parking a vehicle in a target parking space by stopping the vehicle at a backward movement start position, which is in a predetermined positional relationship and a predetermined angular relationship with the target parking space, and then moving the vehicle backwards with the steering wheel operated or further moving the vehicle backwards with the steering wheel turned again reversely thereto, the parking assistance apparatus comprising:
a camera for capturing an area behind the vehicle;
a display provided in a driver seat of the vehicle;
a steering angle sensor for detecting a steering angle;
yaw angle detecting means for detecting a yaw angle of the vehicle; and
a controller,
the controller acquiring a position and a yaw angle of the vehicle continuously from the backward movement start position based on the steering angle detected by the steering angle sensor and the yaw angle of the vehicle detected by the yaw angle detecting means, respectively, and displaying the image captured by the camera on the display in moving the vehicle backwards,
the controller displaying on the display in a superimposed manner an estimated vehicle space indicating at least a lateral position of the vehicle at a position reached by the vehicle in moving the vehicle backwards by a difference between a current yaw angle of the vehicle and an angle of the target parking space while a current steering angle detected by the steering angle sensor is maintained during a final backward movement operation in parking the vehicle in the target parking space; and
the controller displaying on the display in a shifting manner the estimated vehicle space based on a momentary steering angle and a momentary yaw angle of the vehicle, which result from backward movement of the vehicle, and when the steering angle is adjusted during the final backward movement operation, the controller displaying on the display in a shifting manner the estimated vehicle space in the case where the vehicle has moved backwards while maintaining a steering angle after being adjusted by a difference between a yaw angle of the vehicle at a time when the steering angle is adjusted and the angle of the target parking space.

* * * * *